Jan. 17, 1956
J. T. CLARKE
2,731,408
ELECTRICALLY CONDUCTIVE MEMBRANES AND THE LIKE
COMPRISING COPOLYMERS OF DIVINYL BENZENE AND
OLEFINIC CARBOXYLIC COMPOUNDS
Filed Jan. 25, 1952
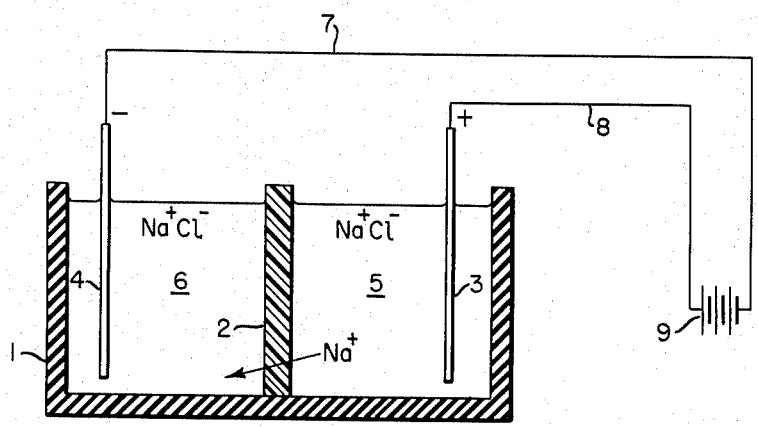
INVENTOR.
JOHN THACHER CLARKE
BY
ATTORNEYS

United States Patent Office 2,731,408
Patented Jan. 17, 1956

2,731,408

ELECTRICALLY CONDUCTIVE MEMBRANES AND THE LIKE COMPRISING COPOLYMERS OF DIVINYL BENZENE AND OLEFINIC CARBOXYLIC COMPOUNDS

John Thacher Clarke, Newton Highlands, Mass., assignor to Ionics, Incorporated, Cambridge, Mass., a corporation of Massachusetts Application January 25, 1952, Serial No. 268,242

12 Claims. (Cl. 204—151)

This invention relates to electrically conductive solid materials having ionic selectivity and substantial cation exchange capacity and in particular to hydrous synthetic organic electrolytic polymers which are copolymers of divinyl benzene or substituted divinyl benzenes and olefinic carboxylic acid-forming compounds with or without vinyl benzene and/or substituted vinyl benzene, and to methods of preparing them. This case is a continuation-in-part of applicant's prior copending case, Ser. No. 260,080, filed December 5, 1951.

Until recently, solid materials, particularly synthetic organic resins, having substantial ion exchange capacity were obtainable only in particulate form, such as granules or beads. The copending application of Walter Juda and Wayne A. McRae, Serial No. 103,784, filed July 9, 1949, now Patent No. 2,636,851, issued April 28, 1953, describes synthetic polymeric materials in the form of hydrous gels which may be formed into such large dimensioned structures as membranes, tubes, rods, vessels and the like. These materials, like ion exchange resins, include in their polymeric structure dissociable ionizable radicals one component of which is fixed into or retained by the polymeric matrix and at least one component of which consists of a mobile and replaceable ion electrostatically associated with the fixed component. The ability of the mobile ion to be replaced, under appropriate concentration conditions, by ions of the same charge, imparts ion exchange characteristics to these materials.

More important, however, is the effect the fixed radicals have on the electroconductive properties of these materials. The fixed ions possess charges which attract mobile ions of opposite sign, and repel ions of the same sign. Under the influence of an electric field, ions charged like the mobile ions may be caused to permeate the material exclusively of ions of the opposite sign which are repelled. These materials are accordingly electrically conductive and selectively permeable.

The present invention comprises polymeric solid unfractured structures or barriers of the general characteristics of those described by Juda and McRae, and provides coherent homogeneous solids which are highly conductive and selectively permeable to cations and which also feature substantial cation exchange capacity. It is further a feature of the materials of this invention that they are mechanically durable, so that they may be formed into self-sustaining structures, and are substantially hydraulically impermeable under ordinary pressure differentials, so that they may be used effectively as hydraulic separators. These materials may be used in dialysis and electrodialysis apparatus where advantage may be taken of their selectively permeable and highly conductive properties. Several such arrangements are described in the above identified application of Juda and McRae.

According to the process of this invention, divinyl benzene and/or substituted divinyl benzene with or without additions of vinyl benzene and/or substituted vinyl benzene is caused to copolymerize with an olefinic carboxylic compound as monomers, particularly a compound of the group consisting of maleic anhydride, acrylic acid, and its α-derivatives and the esters, anhydrides and acid chlorides of acrylic acid and its derivatives while maintained in solution in a suitable solvent under conditions preventive of substantial evaporation of the solvent. Polymerization is effected by any of the well-known expedients, for instance, heat, pressure, and catalytic accelerators and is continued until an insoluble, infusible gel is formed substantially throughout the volume of solution. If the olefinic carboxylic monomer acid-forming selected is an anhydride, ester, or acid chloride, the anhydride, ester, or acid groupings are hydrolyzed after polymerization to form carboxylate groups (—COO$^-$ or —COOH) in the polymeric matrix. For this purpose, the polymerized solid material is saturated with water or with an aqueous solution of an acid or base with or without heating thereby converting the anhydride, ester, or acid chloride grouping to the salt or acid form. Ordinarily the polymerized solids are most useful in the aqueous form, that is, when the solvent of polymerization is replaced (after polymerization) by water or a water solution, for example, by repeated immersion in water. However, the selectively permeable and highly conductive properties are not significantly altered when the polymerized material is saturated (after hydrolysis) with a non-aqueous hydrophilic solvent, for example, glycerine. In this instance, the polymerized material may then be used to remove cations, such as sodium, from the glycerine by passing an electric current through the glycerine and the polymerized structure to effect the migration of the cations into and through the structure.

By maintaining dissolved or dispersed conditions throughout the polymerization, there results a solid gel containing a continuous liquid phase which retains the form of the dispersed mass and which is furthermore a coherent and homogeneous structure. The presence of a solvent phase in polymerization appears to be effective in providing a solid structure which in the aqueous form is electrically conductive and selectively permeable to cations. The volume of the solvent present during polymerization has been found to determine or fix the equilibrium solvent content of the polymerized gel structure. That is, the gel, when one solvent is replaced by another, imbibes about the same volume of liquid as was present during polymerization. The gel does, however, shrink when solvent is removed from it, as by evaporation, (regaining nearly the volume on resolvation, however) which indicates that the polymeric matrix of the gel is not rigid but is of limited extensibility.

It has been found that in order to attain these desirable characteristics, the solvent of polymerization should be present during polymerization to the extent of at least 20 per cent by weight based on the weight of condensed solid material including solvent and should not at any time, either during polymerization or afterwards, be reduced unless replaced with another solvent. Permitting the solvent content to become lower is likely to cause cracking of the structure or impairment of the electrical properties of the material. Although a minimum solvent content of 20 per cent has been found effective for the purpose of this invention, preferred embodiments include much larger amounts between 35 and 70 per cent, and may include such larger amounts as do not interfere with the physical structure of the solid. Structures including as much as 80 per cent of solvent have been found entirely satisfactory.

Ordinary curing conditions in which the solvent is not present or in which it is allowed to escape or evaporate, do not result in the formation of continuous, coherent, or homogeneous structures which are selectively permeable and electrically conductive. Either a continuous resinous dielectric results as is typified by the well-known acrylate or styrene molding resins, or a fractured or particulate structure results, which is typified by the granular ion exchange resins, for example, those described in U. S. Patents 2,340,110 and 2,340,111.

The products produced in accordance with this invention have been found to have high electrical conductivities, generally in excess of $5 \times 10^{-3}$ ohm$^{-1}$ cm.$^{-1}$. They are substantially selectively permeable to cations as indicated by the fact that in the standard concentration cell

| calomel electrode | sat'd KCl bridge | 0.1 N KCl | membrane | 0.01 N KCl | sat'd KCl bridge | calomel electrode |
|---|---|---|---|---|---|---| at 25° C., a characteristic concentration potential approaching the thermodynamic ideal of 55.1 millivolts may be measured. The ion exchange capacity of these materials is in excess of 0.3 milliequivalent per gram of solid material after drying to constant weight at 105° C., and they possess hydraulic resistivities in excess of $10^2$ atm. sec. cm.$^{-2}$ (the pressure in atmospheres required to cause liquid to permeate a centimeter cube of the material at the rate of one cubic centimeter per second).

Structures may be formed in accordance with this invention by casting or molding (including pressure molding) the solution of polymerizable components and catalysts, and causing polymerization in the molds or casts, as by heating, while preventing the evaporation or escape of substantial amounts of solvent (for instance, by closing the molds or otherwise carrying out the polymerization under substantially saturated solvent conditions). In this way, forms and structures may be prepared in any desired shape and size, including structures having at least one and preferably at least two dimensions greater than ¼ inch, and which are accordingly far greater in size than structures in which conventional ion exchange materials have been made in the past. The structures may, for example, have a shape and size suitable for membranes. Such cast or molded structures may, if desired, be further formed as by machining or grinding. Reinforcing materials which do not interfere with the polymerization, such as glass cloth or glass matting, may be included in the molds or casts. On the other hand, the reinforcing material may be impregnated with the unpolymerized solution and polymerization subsequently carried out under conditions which prevent the escape of solvent.

The olefinic carboxylic acid-forming compounds which constitute one of the ingredients of the product of this invention may be one or more of the group consisting of maleic anhydride, acrylic acid, and its α-derivatives, and the anhydrides, esters, and acid chlorides of acrylic acid and its α-derivatives. The preferred olefinic carboxylic acid-forming compounds are maleic anhydride, methacrylic acid, and acrylic acid. The substituted vinyl benzene which may constitute one of the components of this invention may be styrene or its nuclear and/or α-substituted derivatives such as ethyl vinyl benzene, chlorostyrenes, paramethylstyrene, cyanostyrene, methoxylstyrene, acetylstyrene, α-methyl styrene, and α-methyl vinyl toluene. The substituted divinyl benzenes which may constitute one of the components of this invention may be nuclear and/or α-substituted derivatives such as divinyl toluene α,α'-dimethyl divinyl benzene, and α-α'-dimethyl divinyl toluene.

For many purposes it is desirable to use pure divinyl benzene or substituted divinyl benzene and a carboxylic acid-forming compound in the molar ratios shown below. However, divinyl benzene of commerce contains a considerable fraction of ethyl vinyl benzene, a difficultly separable impurity.

The results of actual analysis of three lots of commercial divinyl benzene, one specified as being 20–25 per cent divinyl benzene, another 50–60 per cent divinyl benzene, and the third as 76 per cent are given below.

TABLE I

|  | 20–25% DVB | 50–60% DVB | 76% DVB |
|---|---|---|---|
|  | Percent | Percent | Percent |
| Divinyl benzene | 17 | 55 | 76 |
| Ethylvinyl benzene | 49 | 35 | 23 |
| Diethyl benzene | 34 | 10 | 1 |

For some applications it is permissible to incorporate vinyl benzene or substituted vinyl benzene in the structure, however, at the risk of decreasing the improved mechanical and electrical properties.

Suitable solvents for the polymerization are dioxane and other ethers, chlorinated compounds, such as ethylene chloride, or ketones such as acetone. Other solvents may be used which are susceptible of forming solutions of the required concentration with the divinyl benzene and the carboxylic compound, and which do not interfere with the polymerization of vinyl monomers.

Suitable catalysts which may be used include all those which can be used to effect the polymerization of vinyl compounds reacting by means of free radicals. A preferred catalyst is 2-azo-bis-(isobutyronitrile).

The rate of polymerization depends, in part, upon the concentration and nature of the solvent and catalyst present, and upon the temperature of the polymerization and should be so controlled as to allow convenient casting of the polymerizable solution and to prevent undue temperature increases which may result in escape of the solvent or the formation within the polymerizing solution of solvent vapor bubbles by the heat of polymerization. Suitable proportions of catalysts and conditions of polymerization in particular applications will be illustrated in the examples. In general best results are obtained when the nature and concentration of catalyst and the temperature are such as to require at least one hour for the completion of polymerization.

The proportions in which the polymerizable ingredients should be combined are most accurately described in molar ratios. In this connection, it is necessary to take into account the fact that divinyl benzene of commerce contains up to 70 mol per cent of ethyl vinyl benzene and other impurities separable with only great difficulty. (The amount of divinyl benzene may be determined by standard analytical techniques, for example, by titration with bromine solution.) Preferably, 0.1 to 0.75 mol of olefinic carboxylic acid-forming compound are used per mol of total polymerizable ingredients, and 0.1 to 0.9 mol of divinyl benzene or substituted divinyl benzene per mol of total polymerizable ingredients. Not more than 8 mols of carboxylic compound per mol of divinyl benzene should be used. So long as the above molar ratios are satisfied, vinyl benzene or substituted vinyl benzenes may be added in addition to that present in commercial divinyl benzene though at the risk of impairing the desirable electrochemical and mechanical properties of the polymerized structure. The amount of free radical catalyst is preferably 0.1 to 2.0 per cent of the weight of polymerizable ingredients. Combinations outside these proportions may be used to produce large dimensioned structures according to this invention, but with some sacrifice of the desirable mechanical and electrochemical properties. For instance, the ratio of carboxylic compound to divinyl benzene may be increased above 8.0 but decreased mechanical strength and undue volume change of the polymerized structure with change in species of the mobile ions of the structure may result. The amount of carboxylic compound may be decreased below 0.1 mol per mol of polymerizable ingredients but unsatisfactorily low conductivity results when less carboxylic compound than recommended is used.

If desired, the mixture of polymerizable ingredients may be partially polymerized before casting. This results in an increase in the viscosity of the solution and may be desirable in some cases to facilitate casting.

The following examples have been selected for purposes of illustration and are not presented to suggest limitations not previously described and not included in the appended claims.

In the accompanying drawing:

The figure is a diagrammatic elevation in cross-section of an electrodialysis cell containing a membrane produced in accordance with the invention.

*Example 1.—Copolymer of commercial divinyl benzene and maleic anhydride*

In 200 cc. of peroxide-free dioxane, were dissolved 98 grams (1 mol) of maleic anhydride and 108 cc. of inhibitor-free 40–50 per cent divinyl benzene of commerce (by actual analysis containing 44 mol per cent of divinyl benzene). About 0.2 gram of 2-azo-bis-(isobutyronitrile) were added and the mixture polymerized between two glass plates spaced 1 mm. apart at 65° C. for twenty hours. During polymerization, evaporation of solvent into the space between the plates beyond the area occupied by cast occurred only at the edges of the cast. The dried edges sealed the interior of the cast from additional evaporation of solvent. After polymerization is complete, the dried edges were trimmed off and discarded. Polymerization appeared to be substantially complete within three hours. After cooling, the polymer was then leached with water and then boiled briefly in 1 N hydrochloric acid in order to hydrolyze the anhydride groups. The resulting membrane was then equilibrated with 1 N sodium hydroxide and then thoroughly leached until the wash waters reached a constant pH (about 10). The electrochemical properties are listed in Table II.

*Example 2.—Copolymer of commercial divinyl benzene and acrylic acid*

In 180 cc. of pure dioxane were dissolved 69 cc. (1 mol) of distilled glacial acrylic acid, 108 cc. of the commercial divinyl benzene of Example 1 and about 0.2 gram of 2-azo-bis-(isobutyronitrile) and polymerized as in Example 1. The resulting membrane was leached in distilled water, equilibrated with 1 N sodium hydroxide, and again thoroughly leached with water. Properties are listed in Table II.

*Example 3—Copolymer of commercial divinyl benzene and methacrylic acid*

In 180 cc. of pure dioxane were dissolved 85 cc. (1 mol) of distilled methacrylic acid, 108 cc. of the commercial divinyl benzene of Example 1 and about 0.2 gram of 2-azo-bis-(isobutyronitrile). The mixture was polymerized as in Example 2. Properties are listed in Table II.

TABLE II

| Example | Divinyl Benzene and— | Moisture, Percent | Cap., meq./g. | E. M. F. | Cond., ohm$^{-1}$cm. $\times 10^3$ |
|---|---|---|---|---|---|
| 1 | Maleic Anhydride. | 41 | 2.10 | 11 | 6.7 |
| 2 | Acrylic Acid | 60 | 2.70 | 13 | 10.0 |
| 3 | Methacrylic Acid. | 57 | 2.50 | 12 | 6.7 |

The physical characteristics of the membranes produced in the above examples are set forth in Table II. The moisture content was obtained by drying a specimen in the aqueous hydrogen form to constant weight at 105° C. and expressing the loss of weight as per cent of the weight of the undried material.

The ion exchange capacity was determined by bringing a specimen into equilibrium with a 1 N sodium hydroxide solution, then leaching repeatedly in distilled water to remove absorbed sodium hydroxide until the leached water attained a comparatively stable pH. This pH is about 10. The specimen in this condition was then put in ten times its weight of distilled water and titrated with 0.1 N hydrochloric acid to an equilibrium pH of 5. The capacity is expressed as the number of milliequivalents of hydrogen used in the titration per 105° C. dried gram of material in the hydrogen form.

The concentration potential was measured in a concentration cell with a specimen separating a 0.60 N aqueous sodium chloride solution and a 0.30 N aqueous sodium chloride solution. The electrodes were saturated calomel electrodes connected to the sodium chloride solutions by means of saturated potassium chloride salt bridges. The specimen was brought into equilibrium with a 1 N sodium hydroxide solution and then leached repeatedly to remove absorbed sodium hydroxide and to bring the specimen to a comparatively stable pH with distilled water. This pH is about 10. The specimen was then equilibrated in 0.60 N aqueous sodium chloride solution prior to insertion in the cell. The respective solutions in the cell were continuously renewed to maintain the concentrations. The values recorded in Table II are the open circuit potentials after steady conditions were attained. In such a cell the thermodynamically ideal concentration potential is 17 millivolts. It will be seen from Table II that this standard was consistently approached.

The electrical conductivity was measured by forming from a leached specimen a strip 10 cm. long, 1 cm. wide, and 0.1 cm. thick, clamping the ends to copper electrodes and measuring the resistance to 60 cycles alternating current. The conductivity is the reciprocal of the restivity.

In the foregoing examples, maleic anhydride, acrylic acid, and methacrylic acid were selected as the preferred and representative olefinic carboxylic acid-forming compounds but it will be understood that these examples may be multiplied by substituting those carboxylic compounds described above for the carboxylic compounds of the examples. Similarly, divinyl benzene of commerce has been used. However substituted divinyl benzene of the group specified above may be used if desired. Broadly, this invention and a general description of the methods of practicing it are set forth in the paragraphs immediately preceding the specific examples.

The following example illustrates the practical application of the structures of this invention in the treatment of liquids containing dissolved ionized substances.

*Example 4*

The structures of the above examples may be tested for their water-treating properties in a simple cell shown schematically in the drawing. Solutions 0.03 N in sodium chloride (a concentration of dissolved substances often found in naturally occurring brackish waters) are held in a container 1 separated by electrolytically conductive structures 2 prepared in accordance with the above examples. Graphite electrodes 3 and 4 are present in the chambers 5 and 6 and contact the sodium chloride solution contained in the chambers. Electrolytically conductive leads 7 and 8 connect the electrodes with a source of voltage, for example, a D. C. battery 9, of such polarity that the electrode 3 is anodic. The structures are first equilibrated with 1 N sodium hydroxide solution and then leached with distilled water until the leach water has a pH of 10. When an electric current is imposed, chlorine is evolved at electrode 3 and hydrogen at electrode 4. It is found that the current is carried across the structure 2 almost completely by sodium ions passing out of chamber 5 into chamber 6 thereby reducing the sodium ion content of the solution in chamber 5.

From the foregoing it will be appreciated that this invention provides not only a novel solid gel structure and a method of preparing it, but also a novel use thereof in the field of electrodialysis.

The term "solvent" herein is used with reference to solvents for the precursor materials of the polymeric structures and to liquids capable of solvating the gel structures containing them. The gel structures themselves are insoluble as explained above.

Having thus disclosed my invention, I claim as new and desire to secure by Letters Patent:

1. The method of forming a solid cation-permeable unfractured membrane structure of divinyl benzene-olefinic carboxylic acid-forming copolymers, said structure having at least two dimensions in excess of 0.25 inch, comprising copolymerizing not more than 8 mols of a monomer of the group consisting of olefinic carboxylic acids and the anhydrides, esters and acid chlorides thereof per mol of divinyl benzene to the insoluble infusible stage while maintained in a solution containing at least 20 per cent of solvent, by weight based upon the weight of polymerized solid material including solvent, and under conditions preventive of the escape of said solvent.

2. The method defined by claim 1 wherein the olefinic carboxylic acid is acrylic acid.

3. The method defined in claim 1 with the additional step of subsequently saturating the polymerized structure with water.

4. The method of forming a solid cation-permeable unfractured membrane structure of divinyl benzene-olefinic carboxylic copolymers, said structure having at least two dimensions in excess of 0.25 inch, comprising forming a solution containing divinyl benzene and an olefinic carboxylic monomer in the proportions of not more than 8 mols of olefinic carboxylic monomer per mol of divinyl benzene and containing at least 20 per cent solvent by weight of condensed solid material including solvent; casting said solution to the desired form; polymerizing ingredients thereof to the insoluble infusible stage under conditions preventive of escape of solvent; and subsequently saturating the polymerized structure with water.

5. The method defined by claim 4 wherein the olefinic carboxylic monomer is methacrylic acid.

6. The method defined by claim 5 wherein the divinylbenzene and olefinic carboxylic monomer is combined in the ratio of 0.1 to 0.75 mol of the carboxylic compound per mol of polymerizable ingredients.

7. As an article of manufacture a solid cation exchange unfractured membrane structure having at least two dimensions in excess of 0.25 inch, comprising an insoluble infusible polymeric matrix of divinyl benzene and olefinic carboxylic monomers of the group consisting of olefinic carboxylic acids and the anhydrides, esters and acid chlorides thereof, wherein the molar proportion of carboxylic monomers to divinyl benzene is not more than 8 to 1, said matrix being in gel relationship with at least 20 per cent solvent, based upon the weight of polymerized product including solvent, and said solvent presenting a continuous phase throughout said gel.

8. The article defined by claim 7 wherein the olefinic carboxylic monomer is maleic anhydride.

9. As an article of manufacture a solid manufactured membrane structure having at least two dimensions in excess of 0.25 inch, and having an electrical conductivity in excess of $5 \times 10^{-3}$ ohm$^{-1}$ cm.$^{-1}$ and substantial cation permselectivity, comprising an insoluble infusible polymeric matrix containing divinyl benzene and a monomer of the group consisting of olefinic carboxylic acids and the anhydrides, esters, and acid chlorides thereof in the molecular ratio of 0.1 to 0.75 mol of carboxylic compound per mol of polymerizable material and 0.1 to 0.9 mol of divinyl benzene per mol of polymerizable ingredients and not more than 8 mols of carboxylic compound per mol of divinyl benzene, said matrix being in gel relationship with at least 20 per cent of a solvent based on the weight of polymeric material including solvent, said solvent presenting a continuous phase throughout said gel.

10. The method of treating solutions to remove cations therefrom without the substantial transfer of anions thereto, comprising separating said solution from a second electrolytic solution by means of a cation-permeable solid barrier comprising an insoluble infusible copolymeric matrix containing divinyl benzene and a monomer of the group consisting of olefinic carboxylic acids and the anhydrides, esters, and acid chlorides thereof, in the proportions of not more than 8 mols of carboxylic compound per mol of divinyl benzene, said matrix being in gel relationship with at least 20 per cent of solvent by weight, based on the weight of polymer including solvent and said solvent presenting a continuous phase throughout said gel, and passing a direct electric current in series through said solutions and barrier in the direction to cause the migration of cations from the first solution to the second solution.

11. The method of treating solutions of electrolytes to remove cations therefrom which comprises contacting said solution with a cation permselective solid barrier comprising an insoluble, infusible carboxylate-containing polymeric matrix of divinyl benzene and an olefinic carboxylic compound in the proportions of not more than 8 mols of carboxylic compound per mol of divinyl benzene, said matrix being in gel relationship with at least 30 per cent of solvent based on the weight of polymerized non-solvent product, and said solvent presenting a continuous phase throughout said gel, and passing a direct electric current through said solution and said barrier to effect the migration of said cations from said solution into said barrier.

12. As an article of manufacture a solid infusible, unfractured structure in the form of a sheet or membrane comprising a coherent matrix of an insoluble, infusible copolymer of a polyvinyl aromatic compound and an olefinic carboxylic compound, said copolymer being in gel relationship with at least 20 per cent, based upon the weight of the polymerized product, of a solvating liquid which presents a continuous phase throughout said gel.

References Cited in the file of this patent

UNITED STATES PATENTS

| Number | Name | Date |
|---|---|---|
| 2,340,109 | D'Alelio | Jan. 25, 1944 |
| 2,340,110 | D'Alelio | Jan. 25, 1944 |
| 2,340,111 | D'Alelio | Jan. 25, 1944 |
| 2,405,817 | D'Alelio | Aug. 13, 1946 |
| 2,408,615 | Dudley | Oct. 1, 1946 |
| 2,430,109 | D'Alelio | Nov. 4, 1947 |
| 2,471,818 | Hunter et al. | May 31, 1949 |
| 2,500,149 | Boyer | Mar. 14, 1950 |
| 2,533,635 | Seymour | Dec. 12, 1950 |
| 2,593,540 | Cornwell | Apr. 22, 1952 |
| 2,636,851 | Juda et al. | Apr. 28, 1953 |
| 2,647,886 | Seymour | Aug. 4, 1953 |